Figure 1:
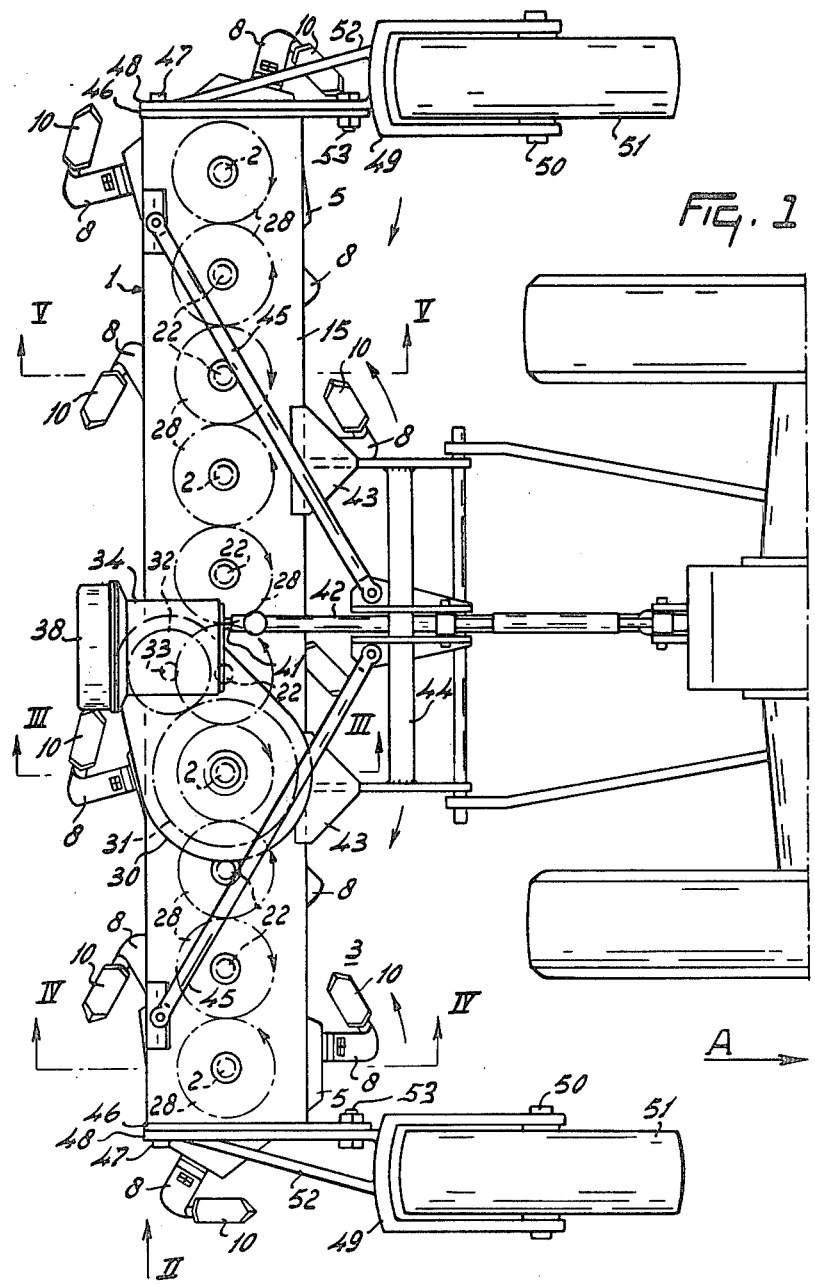

United States Patent [19]

van der Lely et al.

[11] 4,199,031
[45] Apr. 22, 1980

[54] SOIL CULTIVATING MACHINES

[75] Inventors: Ary van der Lely, Maasland; Cornelis J. G. Bom, Rozenburg, both of Netherlands

[73] Assignee: C. van der Lely N. V., Maasland, Netherlands

[21] Appl. No.: 804,389

[22] Filed: Jun. 7, 1977

[30] Foreign Application Priority Data

Jun. 10, 1976 [NL] Netherlands .................. 7606256
Mar. 17, 1977 [NL] Netherlands .................. 7702876

[51] Int. Cl.² ............................................. A01B 33/06
[52] U.S. Cl. ..................................... 172/59; 172/271
[58] Field of Search .................. 172/59, 111, 71, 125, 172/526, 522, 523, 740, 271, 109

[56] References Cited

U.S. PATENT DOCUMENTS

| 78,400 | 5/1868 | Standish | 172/271 |
|---|---|---|---|
| 358,209 | 2/1887 | Lindgren | 172/271 |
| 1,541,010 | 6/1925 | Vacek | 172/740 |
| 2,034,779 | 3/1936 | Storey | 172/59 |
| 3,450,212 | 6/1969 | Sylvester | 172/271 |
| 3,667,551 | 6/1972 | Lely | 172/59 |
| 3,946,816 | 3/1976 | Lely | 172/59 |
| 4,003,439 | 1/1977 | Lely | 172/125 |

FOREIGN PATENT DOCUMENTS

| Ad.13381 | of 1911 | France | 172/59 |
|---|---|---|---|
| 738990 | 10/1932 | France | 172/59 |
| 2274207 | 1/1976 | France | 172/271 |
| 7406084 | 10/1975 | Netherlands | 172/125 |
| 1333 | of 1868 | United Kingdom | 172/271 |
| 443395 | 2/1936 | United Kingdom | 172/523 |

*Primary Examiner*—Richard J. Johnson
*Attorney, Agent, or Firm*—Mason, Mason and Albright

[57] ABSTRACT

A cultivating machine has a row of soil working members rotatable about upwardly extending axes and each member includes a carrier from which tools detachably depend. The lower tool ends have blades that are adjustable and detachable from the remainder of the tools. The blades are normally faced in the direction of rotation of the respective soil working member. The widest portions of the tools are substantially tangential to an imaginary circle centered on their axis of rotation.

9 Claims, 19 Drawing Figures

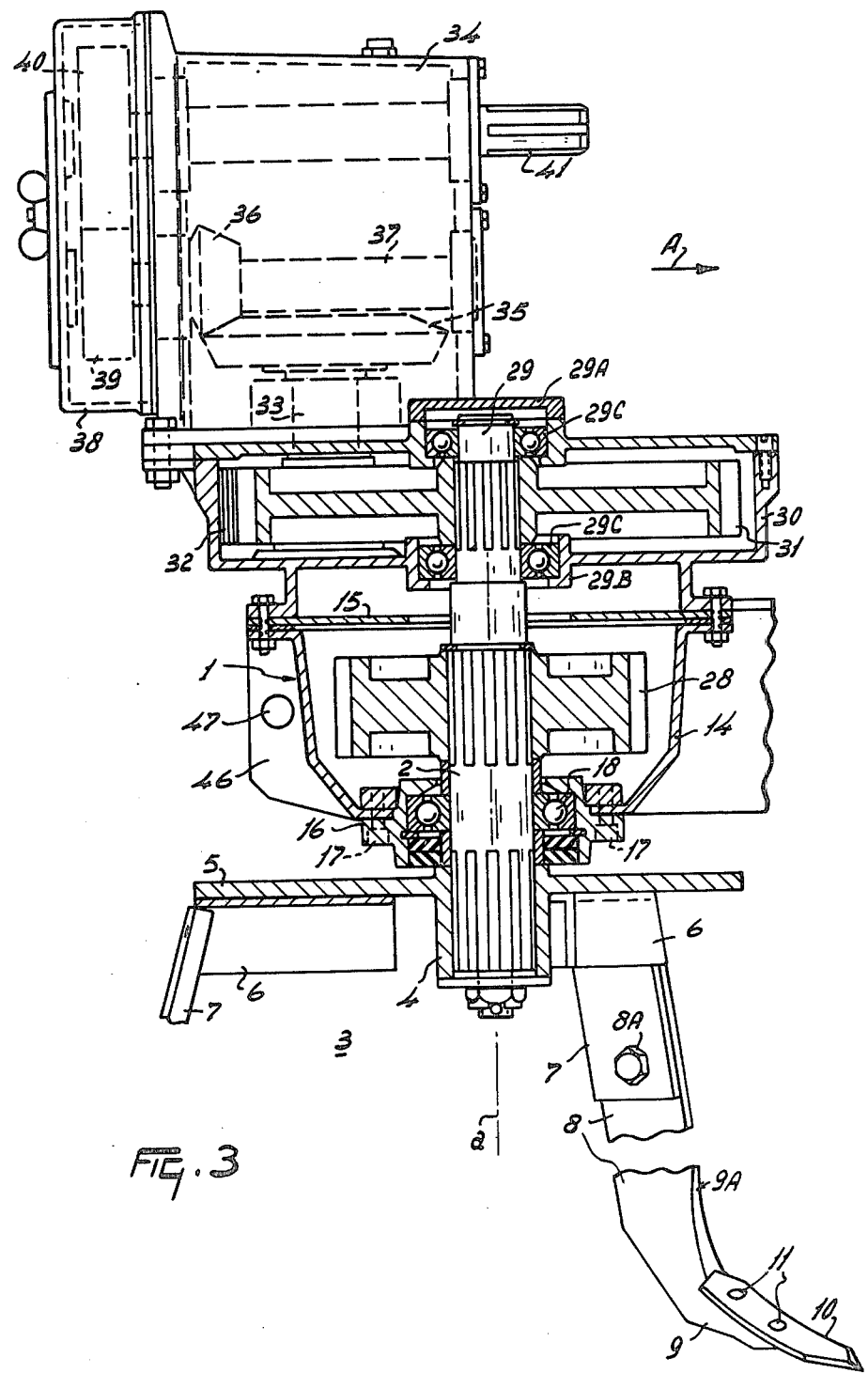

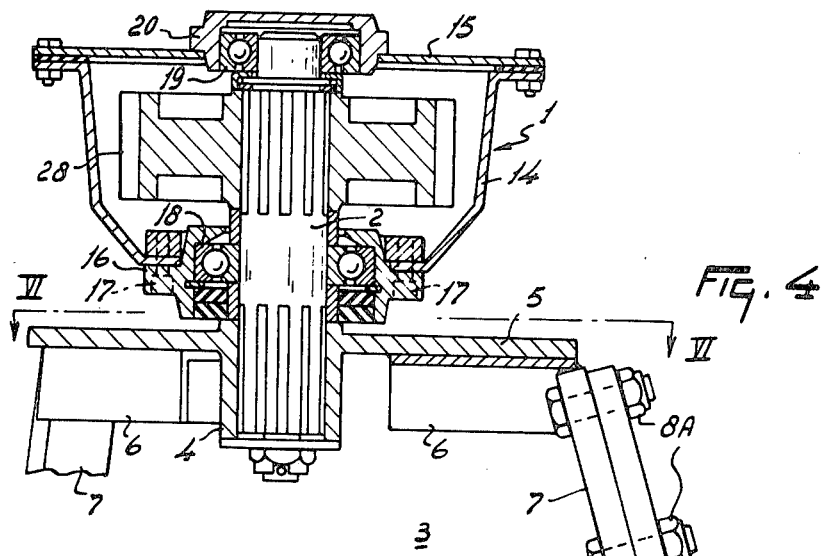
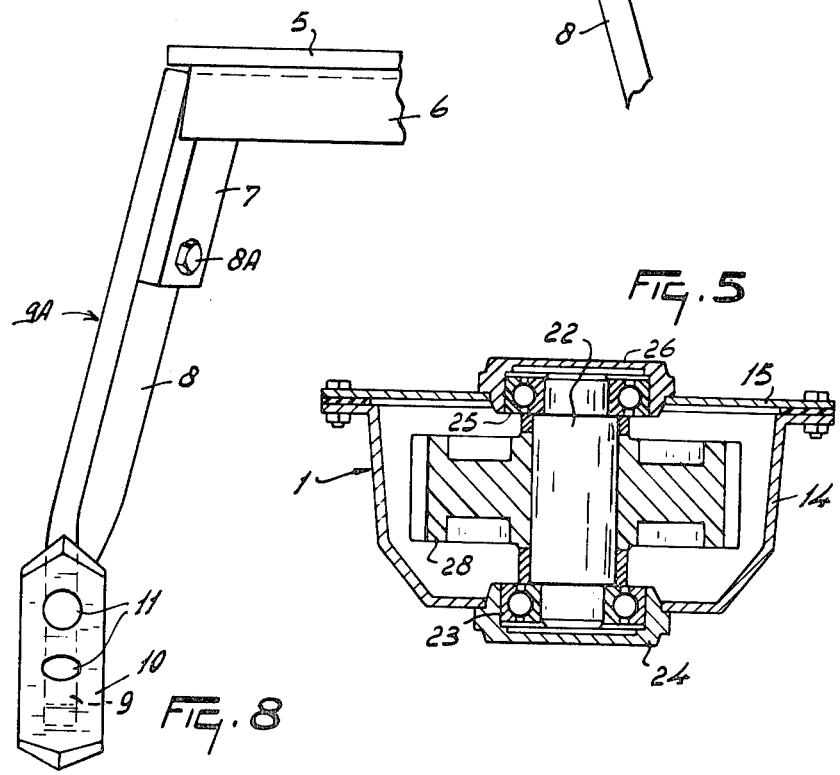

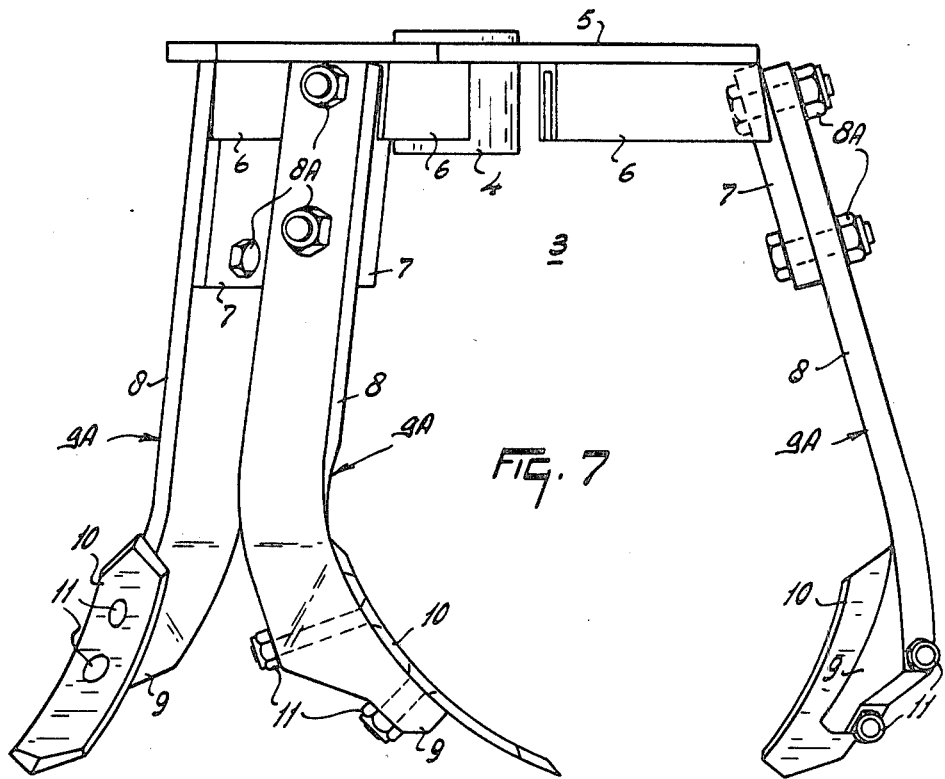
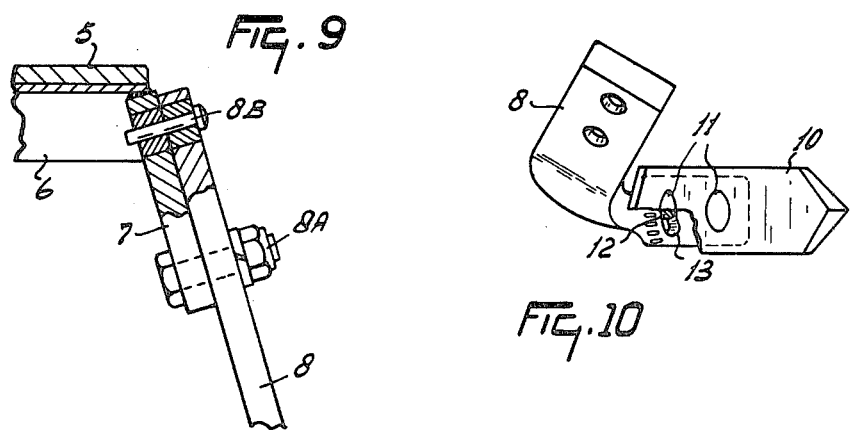

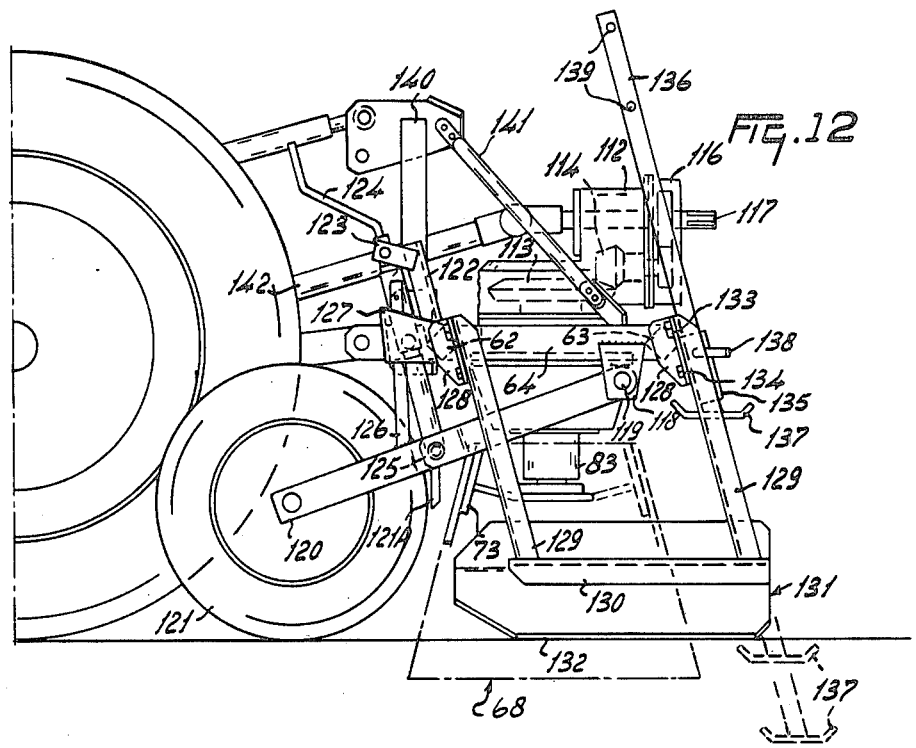
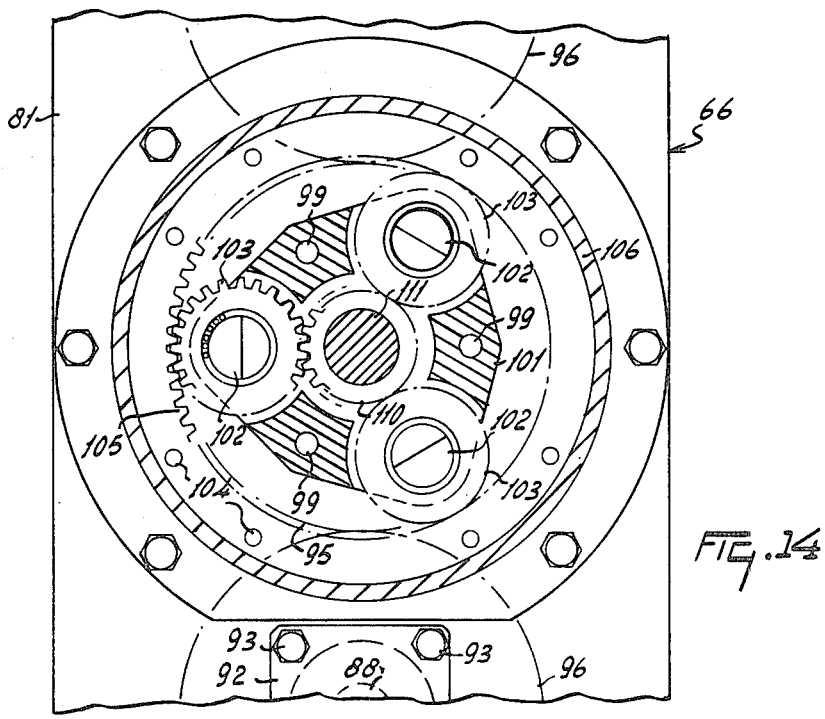

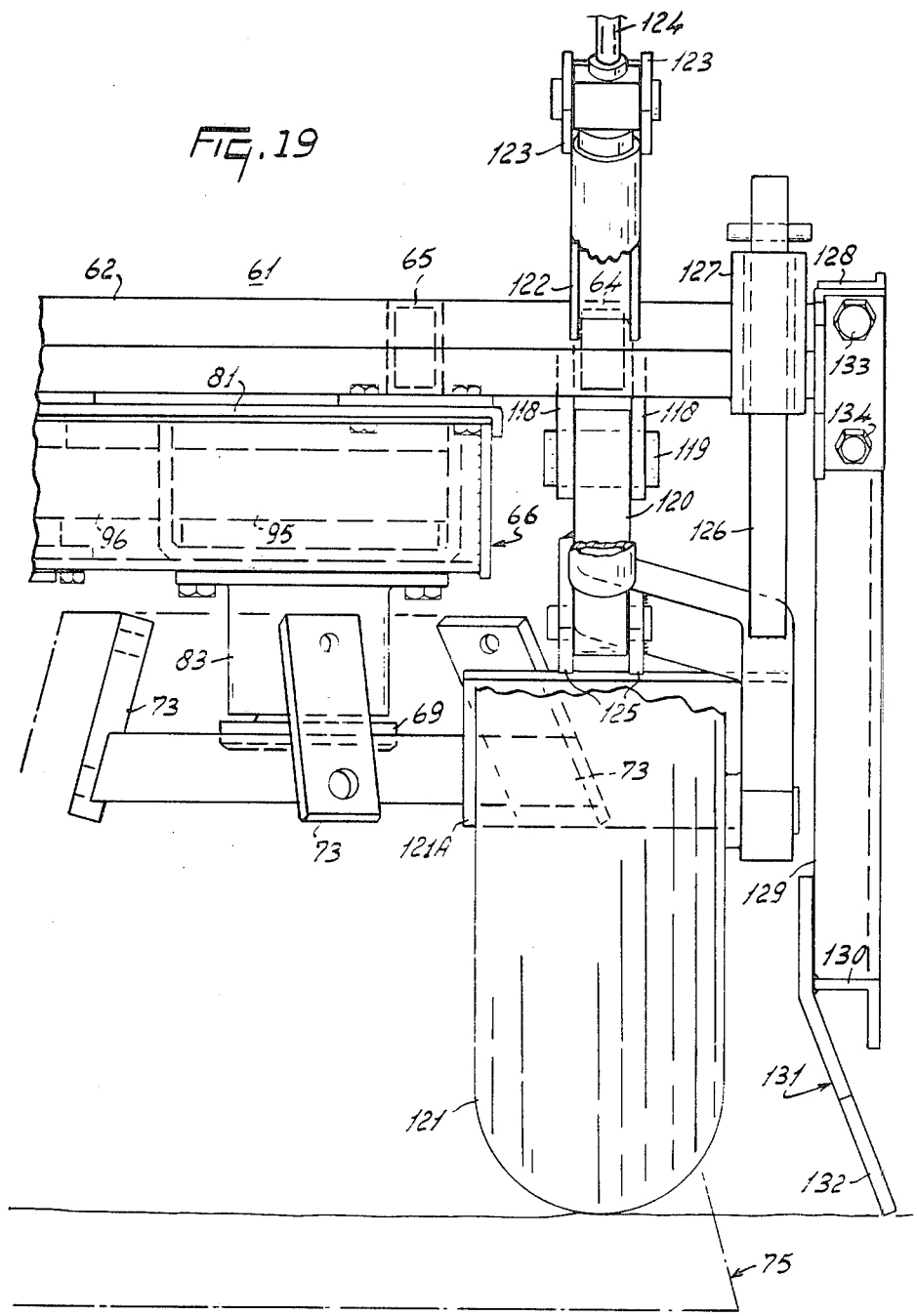

SOIL CULTIVATING MACHINES

This invention relates to soil cultivating machines or implements of the kind which comprise a frame portion that extends transverse to the intended direction of operative travel of the machine, at least one soil working member arranged to rotate about an upwardly extending axis in one direction and at least one soil working member arranged to rotate about an upwardly extending axis in the opposite direction, said soil working members being carried by the frame portion and each of them being provided with at least one cultivating tool.

According to the invention, there is provided a soil cultivating machine of the kind set forth, wherein the axis of rotation of each soil working member is substantially vertically disposed during use of the machine and each cultivating tool comprises a downwardly extending portion whose maximum width is in substantially tangential relationship with an imaginary circle centred upon the axis of rotation of the soil working member concerned, the upper end of said portion of each tool being releasably connected to the remainder of the corresponding soil working member and a lower portion of each tool being provided with a detachable blade.

Figure 2:
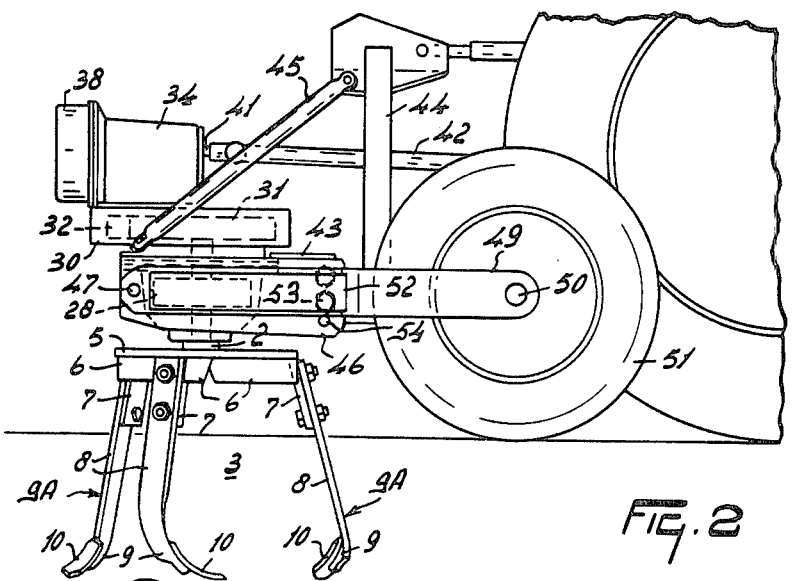
Figure 6:
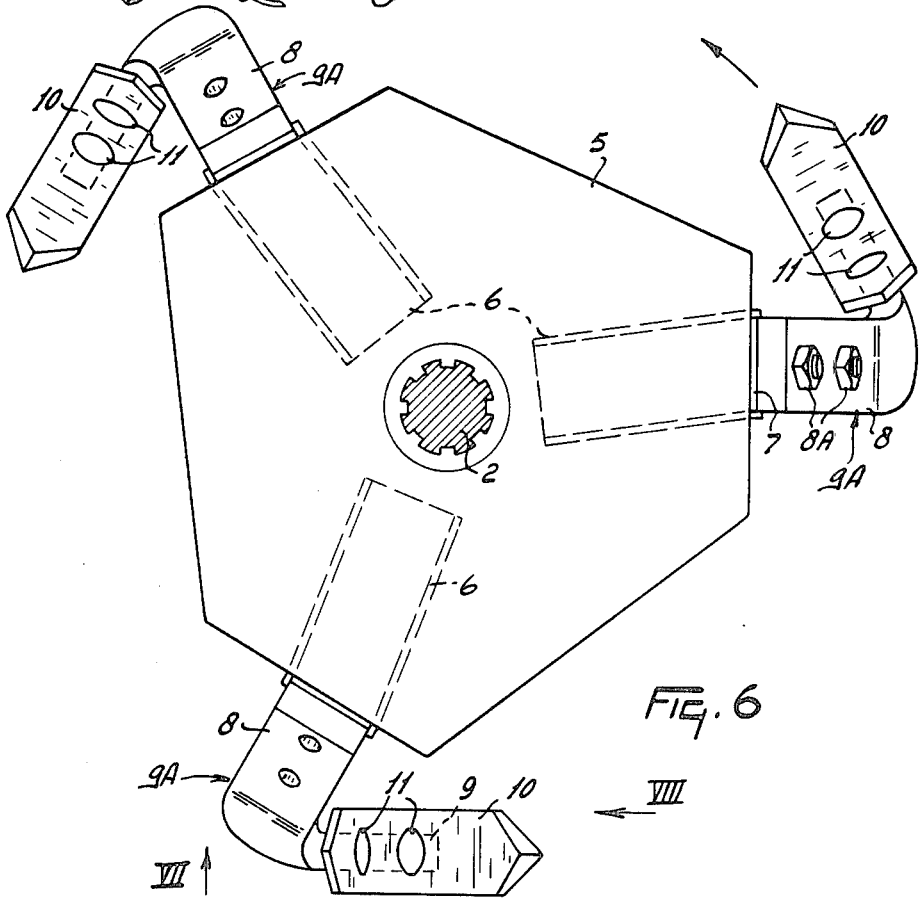
Figure 11:
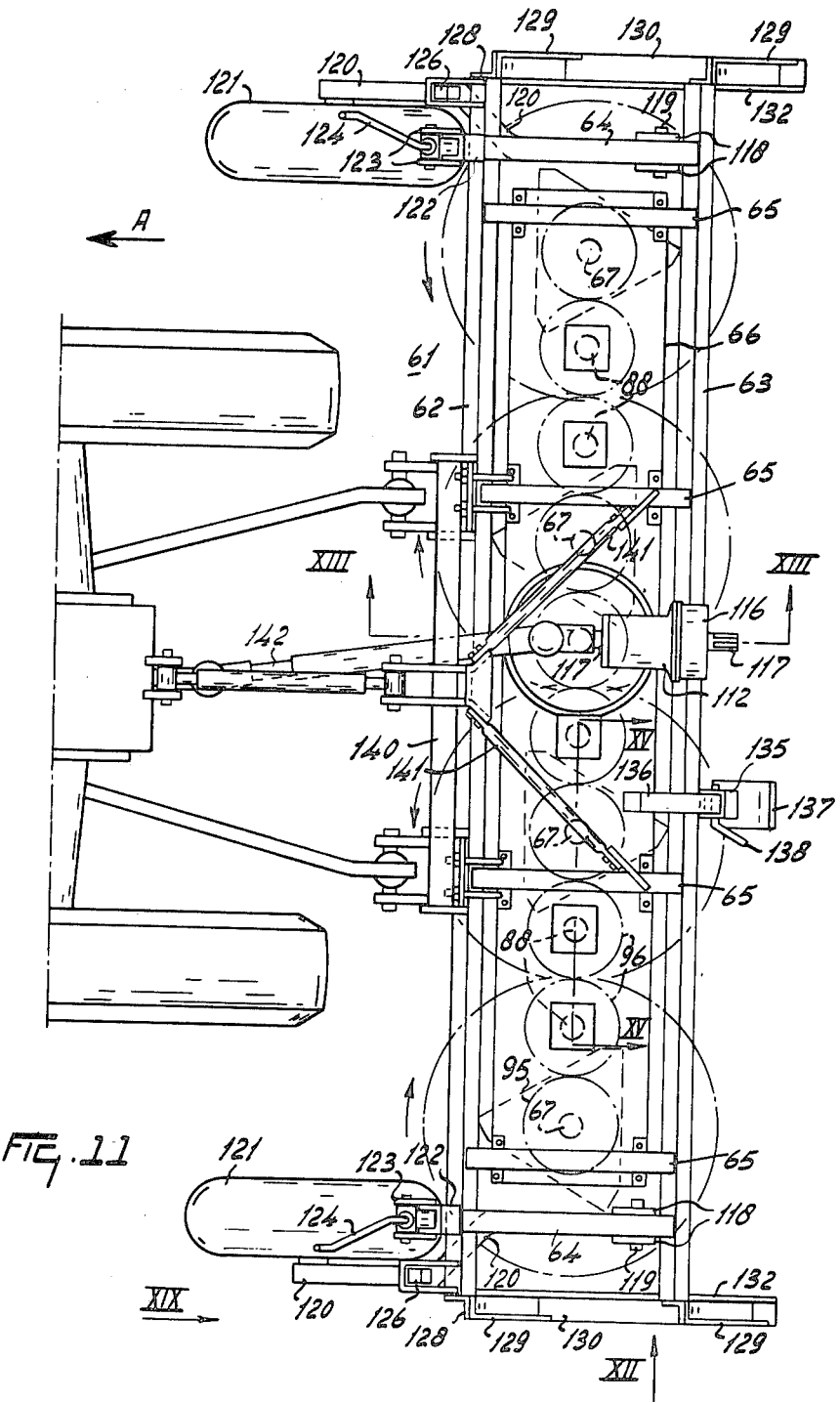
Figure 13:
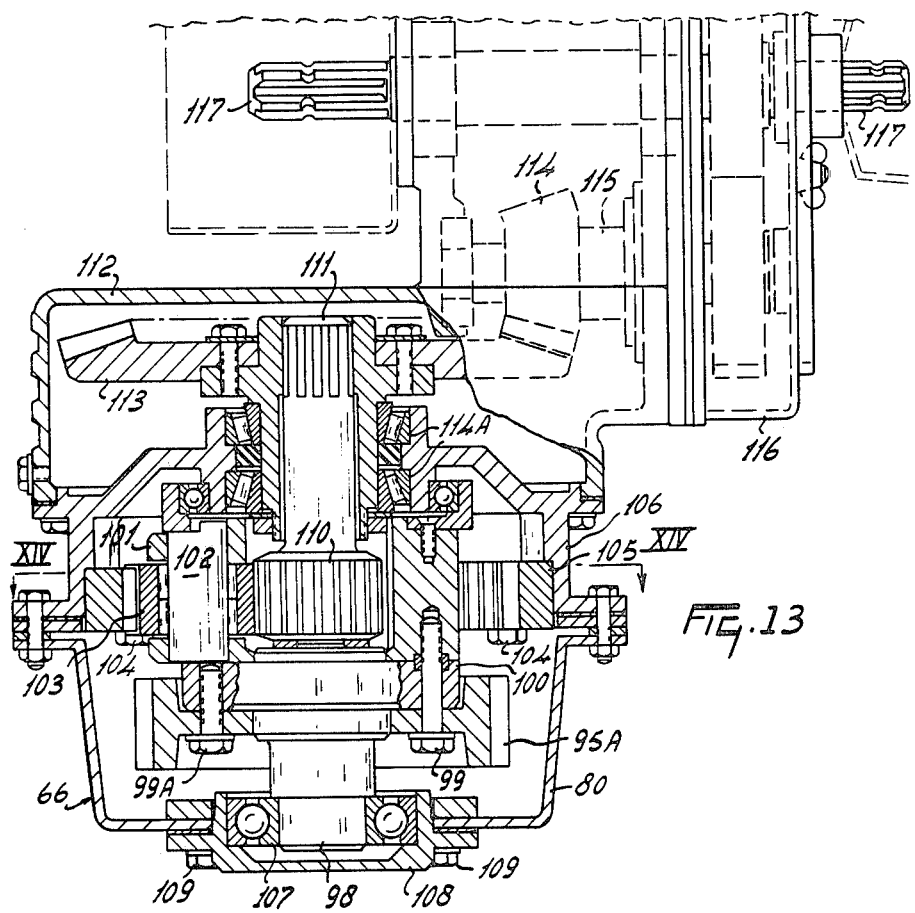
Figure 17:
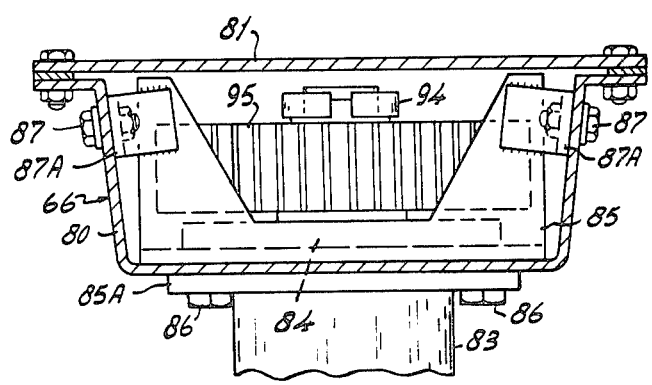
Figure 15:
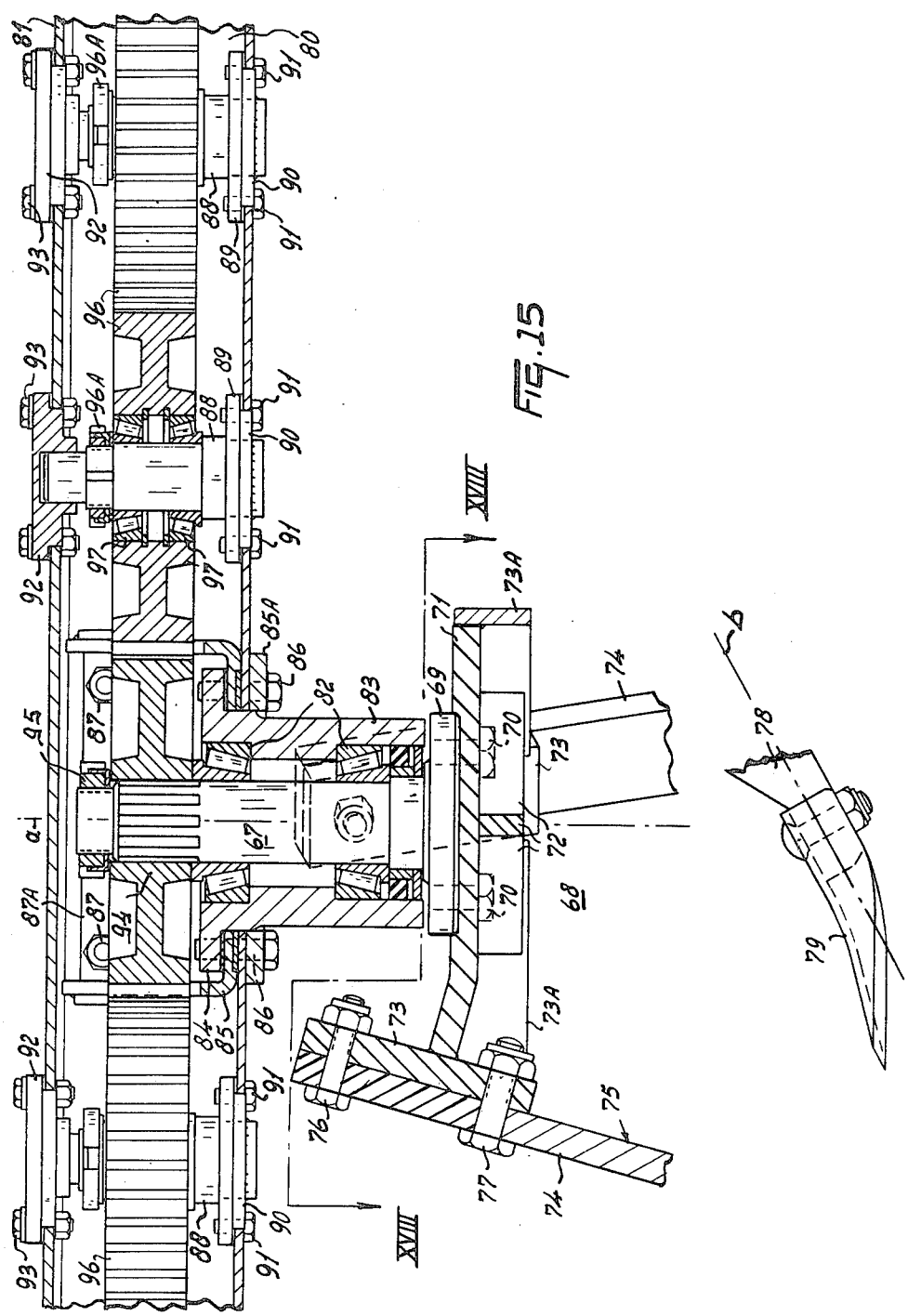
Figure 16:
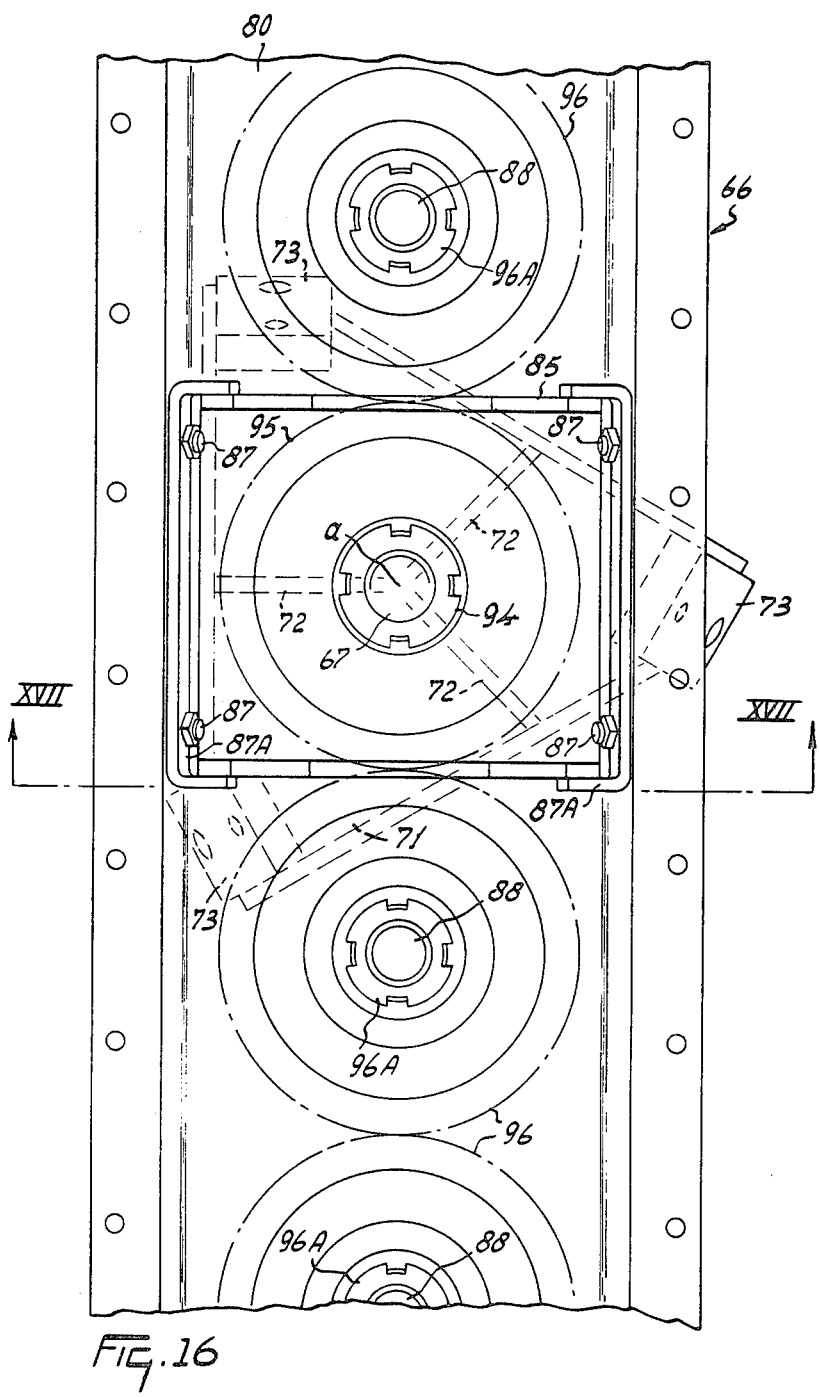
Figure 18:
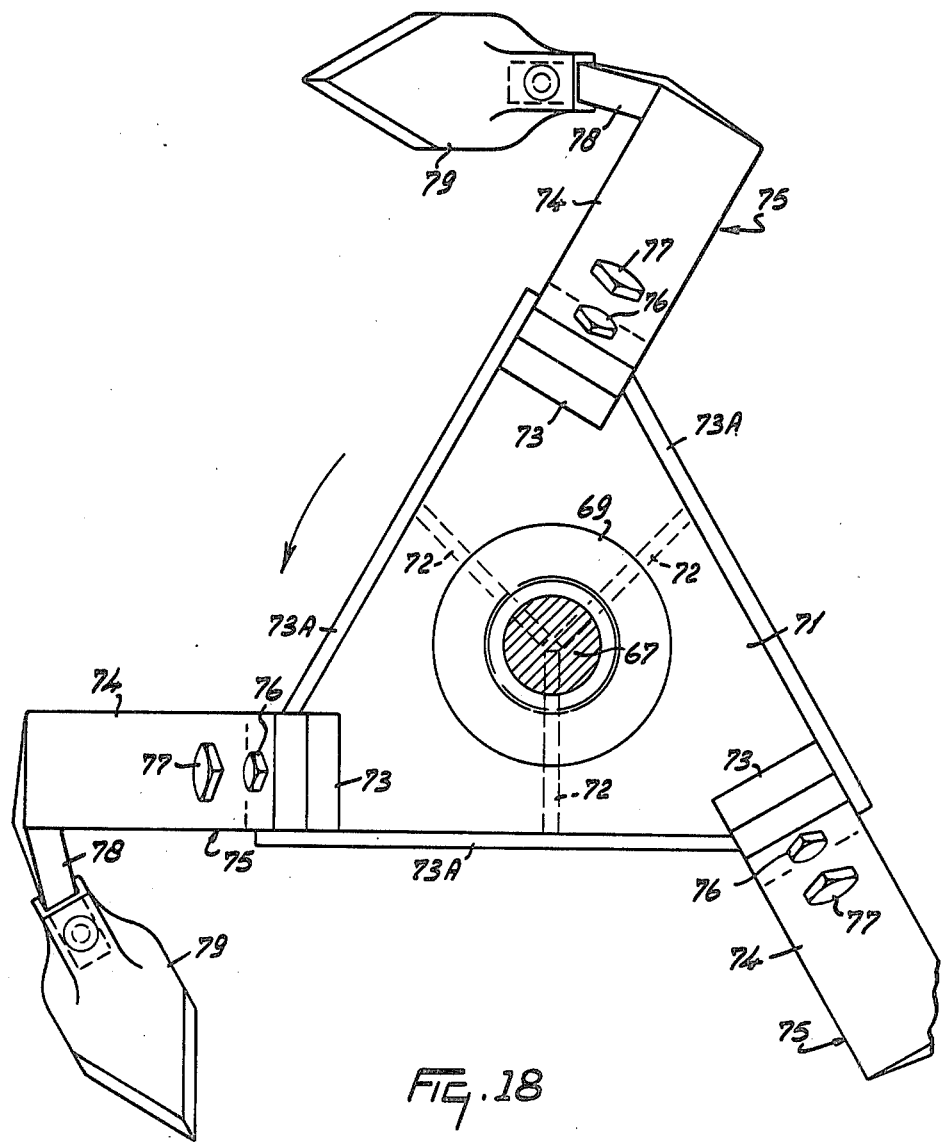

For a better understanding of the invention, and to show how the same may be carried into effect, reference will not be made, by way of example, to the accompanying drawings, in which:

FIG. 1 is a plan view of a soil cultivating machine or implement in accordance with the invention connected to the rear of an agricultural tractor, FIG. 2 is a side elevation as seen in the direction indicated by an arrow II in FIG. 1, FIG. 3 is a section, to an enlarged scale, taken on the line III—III in FIG. 1, FIG. 4 is a section, to an enlarged scale, taken on the line IV—IV in FIG. 1, FIG. 5 is a section, to an enlarged scale, taken on the line V—V in FIG. 1, FIG. 6 is a section, to an enlarged scale, taken on the line VI—VI in FIG. 4, FIG. 7 is an elevation as seen in the direction indicated by an arrow VII in FIG. 6, FIG. 8 is an elevation as seen in the direction indicated by an arrow VIII in FIG. 6, FIG. 9 is a sectional elevation illustrating an alternative fastening construction and arrangement of some parts of the machine, FIG. 10 is a plan view, partly cut away, illustrating an alternative construction and arrangement of other parts of the machine, FIG. 11 is a plan view illustrating an alternative soil cultivating machine or implement in accordance with the invention connected to the rear of an agricultural tractor, FIG. 12 is a side elevation as seen in the direction indicated by an arrow XII in FIG. 11, FIG. 13 is principally a section, to an enlarged scale, taken on the line XIII—XIII in FIG. 11, FIG. 14 is a section taken on the line XIV—XIV in FIG. 13, FIG. 15 is a section, to an enlarged scale, taken on the line XV—XV in FIG. 11, FIG. 16 is a plan view, to an enlarged scale as compared with FIGS. 11 and 12, illustrating a frame portion of the machine and parts of a transmission that are contained therein in greater detail, FIG. 17 is a section taken on the line XVII—XVII in FIG. 16, FIG. 18 is a section taken on the line XVIII—XVIII in FIG. 15, and FIG. 19 is a front elevation, to an enlarged scale, as seen in the direction indicated by an arrow XIV in FIG. 11.

Referring to the accompanying drawings, the soil cultivating machine or implement that is illustrated in FIGS. 1 to 10 thereof is a machine that is intended for the cultivation of the soil to a depth that is significantly greater than that achieved by, for example, a plough during conventional cultivation operations, such conventional cultivation rarely being effective at any depth below the ground surface of more than 22 to 25 centimeters. The machine of FIGS. 1 to 10 of the drawings has a hollow frame portion 1 that extends transverse, and usually substantially perpendicular, to the intended direction of operative travel of the machine which is indicated by an arrow A in FIGS. 1 and 3 of the drawings and similarly, in respect of a further embodiment, in FIG. 11 of the drawings. Four vertically or substantially vertically disposed shafts 2 are rotatably mounted in the hollow frame portion 1 and are regularly spaced apart from one another along the transverse (to the direction A) length of the frame portion 1. The lowermost end of each shaft 2 carries a corresponding soil working member that is generally indicated by the reference 3, the top of each member 3 being in the form of a carrier 5 that is of irregular hexagonal configuration as seen in plan view (FIG. 6). The center of each carrier 5 has an internally splined hub 4 whose splines co-operate with the matching external splines on a downwardly projecting lower portion of the respective shaft 2 (see FIG. 4). Although, as just mentioned, each carrier 5 is actually of irregular hexagonal configuration, it may be considered as having a basically triangular configuration with each of the three corners of the triangle excised. Three metal bars 6 that are each of inverted channel-shaped cross-section have their uppermost bases rigidly secured to the lowermost surface of the corresponding carrier 5 so as to extend substantially radially outwards from near the shaft 2 and hub 4 concerned to a location substantially coincident with a corresponding one of the three edges of the carrier 5 that are formed by the removal of the three corners of the "triangle". The limbs of each bar 6 thus project downwardly towards the ground surface from beneath the corresponding carrier 5. The radially outermost ends of the three bars 6 of each carrier 5 that substantially register with the aforementioned three edges of said carrier are disposed short distances forwardly of the midpoints of those edges with respect to the intended direction of operative rotation of the soil working member 3 concerned (see FIG. 6).

A support 7 is secured between the limbs of each bar 6 at the radially outermost end of that bar and it will be seen from the drawings that the three supports 7 of each member 3 diverge downwardly and outwardly from the carrier 5 concerned with respect to the longitudinal axis of the respective shaft 2. The longitudinal axis of each support 7 is substantially contained in a plane which also contains the longitudinal axis of the corresponding shaft 2. Upper strip-shaped portions 8 of cultivating tools 9A are secured to the downwardly inclined support 7, in parallel and overlapping relationship therewith, by pairs of bolts 8A that are entered through registering holes formed near the tops and bottoms of the overlapping parts. The widths of the strip-shaped portions 8 extend substantially tangentially with respect to imaginary circles centered upon the axes of rotation of the corresponding soil working members 3. The lowermost ends of the strip-shaped portions 8 are bent over to form portions 9 that are orientated forwardly from said portions 8 with respect to the intended directions of operative rotation of the corresponding members 3. The portions 9 also extend substantially tangentially with respect to imaginary circles that are centered upon the axes of rotation of the corresponding members 3. As seen in FIG. 6 of the drawings, a plane which contains the axis of rotation of the member 3 concerned and the downwardly inclined longitudinal axis of one of the strip-shaped portions 8 is inclined to the longitudinal axis of the corresponding tool portion 9 by an angle having a magnitude of not less than 50° and not more than 70°.

Each tool portion 9 releasably carries a pointed blade 10 of the tool 9A concerned. Each blade 10 has a convexly curved lower surface which bears against the broad concave upper edge of the tool portion 9 which carries it. Each blade 10 is of elongate configuration and is of such a length and width that the portion 9 which carries it is located wholly inside an imaginary circle whose center coincides with the axis of rotation a (FIG. 3) of the member 3 concerned and that contains the radially outermost point at one side of the blade 10 (see FIG. 6). It can be seen from FIGS. 7 and 8 of the drawings that the region of transition between each upper strip-shaped tool portion 8 and the corresponding lower tool portion 9 is located directly behind an upper part of the blade 10 concerned with respect to the intended direction of operative rotation of the corresponding member 3. It is preferred that an angle of not less than substantially 10° and not more than substantially 16° should be enclosed between the longitudinal axis of each strip-shaped tool portion 8 and the axis of rotation a of the corresponding member 3 at the point of intersection between those axes. A tangent to the midpoint of the convex curved surface of each blade 10 intersects the horizontal at an angle of substantially 45° and each blade 10 substends an angle of between substantially 70° and substantially 80° at its own center of curvature.

FIG. 9 of the drawings illustrates an alternative arrangement for fastening the strip-shaped tool portions 8 to the supports 7. As illustrated in FIG. 9, the upper bolt 8A is replaced by a shear pin 8B so that, in the event of an excessive resistance to progress of the tool 9A concerned through the soil, the pin 8B will shear and the tool 9A will then be able to yield upwardly, and rearwardly with respect to the direction of rotation of the corresponding member 3 at the time, about the lower bolt 8A which will act as a pivot. In an alternative arrangement which is not illustrated, the tools 9A are maintained in their operative positions by strong springs, said springs being, however, capable of being overcome to allow upward and rearward yielding of the tools 9A when excessive resistances to their progress through the soil are met. Each blade 10 is fastened to the corresponding lower tool portion 9 by two bolts 11 the lower one of which is located principally in advance of the upper one with respect to the intended direction of operative rotation of the corresponding soil working member 3. It can be seen in FIG. 7 of the drawings that the bolts 11 have countersunk heads to prevent exposing said heads of the concave leading curved surfaces of the blade 10. Any blade 10 that is damaged or that becomes worn to an excessive extent can quickly and easily be replaced merely by releasing the nuts that co-operate with the shanks of the bolts 11. FIG. 10 of the drawings illustrates an alternative arrangement for connecting the blades 10 to the lower tool portions 9. In the embodiment of FIG. 10 of the drawings, the holes in the portions 9 that co-operate with the upper rear bolts 11 are formed as arcuate slots 13 whose centers of curvature coincide with the longitudinal axes of the respective lower leading bolts 11. A clamping bolt 12 can occupy any chosen one of a number of different positions along each arcuate slot 13 and the particular position that is chosen dictates the angular setting of the blade 10 concerned about the longitudinal axis of its lower leading bolt 11. The chosen position is maintained by inserting and tightening the upper rear bolt 11 once the clamping bolt 12 has been appropriately sited. As shown somewhat diagrammatically in FIG. 10, a roughened region of the upper surface of each tool portion 9 co-operates frictionally with a region of each blade 10 which latter region (not visible) may, if desired, also be roughened. When the construction of FIG. 10 of the drawings is employed, the leading points of the blades 10 may occupy chosen ones of a number of different spacings from the axes of rotation a of the corresponding soil working members 3.

The hollow frame portion 1 of the soil cultivating machine comprises a trough-shaped part 14 (FIGS. 3, 4 and 5) having upwardly directed limbs formed at their upper edges with outwardly directed substantially horizontally coplanar rims. A substantially horizontal cover plate 15 is releasably secured to the rims of the part 14 by a plurality of small bolts, a gasket being sandwiched between the plate 15 and the rims of the part 14. The regular spacing between the longitudinal axes of the four shafts 2 of the machine advantageously has a value of substantially 75 centimeters and, in order rotatably to support the four shafts 2 in their appointed position in the frame portion 1, the substantially horizontal bottom of the trough-shaped part 14 is formed with corresponding circular holes. These holes have bearing housings 16 fastened in them by bolts 17. A ball bearing 18 rotatably journals each shaft 2 in the corresponding housing 16 and, as shown in the drawings, is associated with appropriately positioned spacing sleeves and oil seals. One of the middle pair of the four shafts 2 (i.e. the shaft 2 that is shown in FIG. 3 of the drawings) has an upward extension 29 through a hole in the cover plate 15 and will be referred to again below. However, each of the other three shafts 2 is rotatably supported at its upper end by a corresponding ball bearing 19 lodged in a bearing housing 20 which is received in a hole in the cover plate 15, said bearing housing 20 being retained in its appointed position in said hole by bolts that are not visible in FIG. 4 of the drawings.

Two intermediate shafts 22 (FIGS. 1 and 5) are arranged in the hollow frame portion 1 between each neighbouring pair of shafts 2, the intermediate shafts 22 being in parallel relationship with the shafts 2 and being regularly spaced apart between those shafts so that, with the preferred spacing that has been referred to above, the longitudinal axes of the total of four shafts 2 and eight intermediate shafts 22 are spaced apart from one another at regular intervals that preferably have magnitudes of substantially 25 centimeters. The lower and upper ends of each intermediate shaft 22 are rotatably supported in the hollow frame portion 1 by corresponding lower and upper ball bearings 23 and 25 which ball bearings are carried by corresponding lower and upper bearing housings 24 and 26. The bearing housings 24 and 26 are lodged in holes in the bottom of the trough-shaped part 14 and in the cover plate 15, respectively, and are maintained in their appointed positions by bolts that are not visible in FIG. 5 of the drawings. Each of the four shafts 2 and eight intermediate shafts 22 is provided, inside the hollow frame portion 1, with a corresponding straight-toothed or spur-toothed pinion 28, the teeth of the row of twelve pinions 28 being in successive mesh with each other. Those pinions 28 that correspond to the four shafts 2 have internally splined hubs that co-operate drivingly with matching external splines on the shafts 2 themselves whereas it will be seen from FIG. 5 of the drawings that there is no splined co-operation between the intermediate shafts 22 and the corresponding pinions 28 because said shafts 22 merely define the axes of rotation of the respective pinions 28 and do not need to be positively driven in rotation thereby. It will be noted from FIGS. 3, 4 and 5 of the drawings that a considerable volume of space exists between the lower end of each pinion 28 and the bottom of the trough-shaped part 14 of the hollow frame portion 1. This space is deliberately provided to receive the very hard fragments of any ball bearings that may possibly break up during the use of the machine. With the provision of this space for broken ball bearing parts, the danger of such broken parts becoming caught between the teeth of the pinions 28 is very considerably reduced so that, in many cases, the failure of one of the ball bearings will require the replacement of that ball bearing alone to restore the machine to a fully operational condition.

The previously mentioned upward extension 29 of one of the center pair of the shafts 2 that is shown in FIG. 3 of the drawings projects into a flat gear box 30 which is fastened in position on top of the frame portion 1 by some bolts which also secure the top cover 15 to the trough-shaped part 14, said bolts that also co-operate with the flat gear box 30 being somewhat greater in length than the other bolts. The shaft extension 29 is rotatably supported in upper and lower bearing housing 29A and 29B of the gear box 30 by corresponding upper and lower ball bearings 29c. The shaft extension 29 is externally splined inside the flat gear box 30 and said splines co-operate with matching internal splines in the hub of a straight-toothed or spur-toothed pinion 31 whose effective diameter is substantially twice that of each of the toothed pinions 28. The teeth of the pinion 31 are in driven mesh with those of a further straight-toothed or spur-toothed pinion 32 (FIGS. 1 and 3), said pinion 32 being a little smaller in effective diameter than each of the pinions 28. It will be apparent that the pinions 32 and 31 in the gear box 30 co-operate to form a speed-reducing transmission.

The pinion 32 is secured to the lower end of a substantially vertical shaft 33, said shaft 33 being rotatably journalled in the gear box 30 but extending upwardly through the top of that gear box into the bottom of a further gear box 34 that is bolted onto the top of the flat gear box 30. The shaft 33 is in parallel relationship with the shafts 2 and intermediate shafts 22 and it will be noted from FIG. 1 of the drawings that, with respect to the direction A, said shaft 33 is located straight behind one of the intermediate shafts 22 that is the immediate neighbour of the shaft 2 which has the upward extension 29. Said intermediate shaft 22 is fifth from one end of the row of twelve shafts and seventh from the opposite end of that row and is thus located very near to the midpoint of the hollow frame portion 1. The upper end of the substantially vertical shaft 33 that is located inside the further gear box 34 carries a crown wheel or bevel pinion 35 (FIG. 3) whose teeth are in driven mesh with those of a much smaller bevel pinion 36 which is fastened to a substantially horizontal shaft 37 that is in parallel or substantially parallel relationship with the direction A. The shaft 37 is rotatably mounted in the further gear box 34 by bearings which are not shown in detail in the drawings. The rearmost end, with respect to the direction A, of the shaft 37 projects through the back of the further gear box 34 into a change-speed gear 38 which has a cover that is mounted in position in a quickly releasable and replaceable manner by, for example the screw-threaded rod and co-operation wing nut that are illustrated. The portion of the shaft 37 that is located inside the change-speed gear 38 is externally splined as in a similarly disposed portion of an overlying parallel shaft 41. The splined portions of the shafts 37 and 41 can receive the matchingly splined hubs of any chosen pair of a number of different pairs of straight-toothed or spur-toothed pinions of different sizes. The chosen pair, and its arrangement relative to the two shafts 37 and 41, dictates the transmission ratio between those shafts. FIG. 3 of the drawings shows the shaft 37 provided with a smaller pinion 39 and the shaft 41 with a larger pinion 40. The leading end of the rotary shaft 41 projects forwardly from the front of the further gear box 34 with respect to the direction A and is there splined to enable it to be placed in driven connection with the power take-off shaft of an agricultural tractor or other operating vehicle through the intermediary of a telescopic transmission shaft 42 (FIG. 1) which is of a construction that is known per se having universal joints at its opposite ends. It will be noted from FIG. 1 of the drawings that the longitudinal axis of the rotary input or driving shaft 41 of the further gear box 34 is contained in, or is very close to, a substantially vertical plane that contains the midpoint of the hollow frame portion 1 and that extends parallel to the direction A. This arrangement ensures that, during operation, the telescopic transmission shaft 42 extends substantially horizontally parallel to the direction A so that the somewhat high torque which is required to rotate the soil working members 3 can be transmitted to the power take-off shaft of the operating tractor or other vehicle in as effective manner as possible and certainly more effectively than if the longitudinal axis of the transmission shaft 42 were steeply inclined to the direction A.

The front of the hollow frame portion 1 with respect to the direction A is provided with a coupling member or trestle 44 that is constructed and arranged to connect the machine to a three-point lifting device or hitch at the rear of the operating agricultural tractor or other vehicle by co-operation with the upper and lower lifting links of that lifting device or hitch. The base of the coupling member or trestle 44 is secured to the front of the hollow frame portion 1 by support plates 43 that are of substantially triangular configuration when seen in plan view (FIG. 1). Coupling plates at the top of the member or trestle 44 have rear regions thereof, with respect to the direction A, rigidly connected to well spaced apart brackets at the top and rear of the hollow frame portion 1 by tie bars 45 that diverge both downwardly, and rearwardly with respect to the direction A, from said coupling plates to the back of the frame portion 1. The opposite ends of the hollow frame portion 1 are closed by substantially vertical side plates 46 that extend parallel to one another and substantially parallel to the direction A, both side plates 46 projecting forwardly beyond the front of the hollow frame portion 1 with respect to the direction A. The two side plates 46 are provided, near their rearmost edges, with substantially horizontally aligned pivots 47 about which corresponding arms 48 are turnable upwardly and downwardly alongside the respective plates 46, said arms 48 being directed forwardly from the pivots 47 with respect to the direction A to locations in front of the leading edges of the side plates 46. In fact, at its leading end, each arm 48 is secured to the base of a corresponding fork 49 whose limbs are interconnected by a substantially horizontal axle 50 that is perpendicular or substantially perpendicular to the direction A. Each axle 50 has a corresponding pneumatically tired ground wheel 51 rotatably mounted thereon between the limbs of the for 49 concerned and it can be seen from the drawings that the connection between each arm 48 and the corresponding fork 49 is strengthened by a strut 52 that obliquely interconnects the arm 48 near its pivot 47 and the base of the corresponding fork 49 at a location spaced from the rigid connection thereto of the arm 48 under consideration.

An inspection of FIG. 1 of the drawings will show that the axial thickness of the pneumatic tire of each ground wheel 51 is substantially equal to, or greater than, the regular spacing (preferably, substantially 25 centimeters) between the axes of rotation of the row of twelve shaft 2 and intermediate shafts 22, the substantially horizontally aligned axes of rotation of the two ground wheels 51 that are afforded by their axles 50 being substantially in line (as seen in plan view—FIG. 1) with the rearmost extremities of the rear ground wheels of the agricultural tractor or other vehicle which is employed to move the machine over the ground and to operate it. The portions of the two side plates 46 that project forwardly with respect to the direction A beyond the front of the hollow frame portion 1 are both formed with vertically spaced apart holes 54 and each of the two arms 48 is also formed with a pair of vertically spaced apart holes that can be brought into register with any chosen two of the corresponding row of holes 54 by turning the arm 48 concerned to an appropriate angular setting about the axis defined by the two pivots 47. It will be apparent that the holes 54 and the holes in the arms 48 are all equidistant from the axis that has just been mentioned. Pairs of upper and lower bolts 53 are provided for entry through the pairs of holes in the arms 48 and through the chosen pairs of holes 54 in the side plates 46 to maintain the arms 48 in corresponding angular setting about the axis defined by the pivots 47 relative to the hollow frame portion 1. Thus, the level of the axis of rotation of the ground wheels 51 relative to the level of the frame portion 1 can be varied to control the depth to which the cultivating tools 9A of the soil working members 3 will penetrate into the soil during the operation of the machine.

In the use of the soil cultivating machine that has been described with reference to FIGS. 1 to 10 of the drawings, its coupling member or trestle 44 is connected to the three-point lifting device or hitch at the rear of an agricultural tractor or other operating vehicle in the manner that can be seen somewhat diagrammatically in FIGS. 1 and 2 of the drawings and the rotary input or driving shaft 41 of the further gear box 34 is placed in driven connection with the rear power take-off shaft of the same tractor or other operating vehicle by way of the known telescopic transmission shaft 42 that has universal joints at its opposite ends. The level of the axes of rotation of the ground wheels 51 relative to the level of the hollow frame portion 1 will have been fixed, in the manner discussed above, before work commences so as to govern the maximum depth to which the cultivating tools 9A of the members 3 can penetrate into the soil This level will be dependent upon the nature and condition of the soil that is to be dealt with and upon the purpose for which that soil is to be used after cultivation. As the machine is moved in the direction A over soil that is to be cultivated, the substantially horizontally disposed telescopic transmission shaft 42 that is in parallel or substantially parallel relationship with the direction A transmits rotary power from the rear take-off shaft of the tractor or other operating vehicle to the input or driving shaft 41 of the further gear box 34 and this rotary drive is transmitted by the parts that have been described above to the total of twelve shafts 2 and intermediate shafts 22. The four shafts 2 directly carry the four soil working members 3 and those four soil working members 3 are caused to revolve around the corresponding axes a in the directions that are indicated by small arrows in FIG. 1 of the drawings, the arrangement being such that each member 3 revolves in the opposite direction to its immediate neighbour or to both of its immediate neighbours. The speed of rotation of the members 3 is set, before work commences, by establishing an appropriate transmission ratio between the shafts 41 and 37 of the further gear bok 34 employing the necessary pair of pinions, such as the pinions 39 and 40, in the change-speed gear 38. Once again, the factors that influence the chosen speed of rotation of the members 3 are the nature and condition of the soil that is to be cultivated and the purpose for which that soil is required after cultivation. As previously mentioned, the arrangement of the known intermediate telescopic transmission shaft 42 in a substantially horizontal position that is parallel or substantially parallel to the direction A ensures that the high torque which has to be transmitted from the tractor or other operating vehicle to the members 3 is transferred as efficiently as possible with very little, if any, oscillation in output speed at the rear delivery end of said shaft 42. It has been noted above that the flat gear box 30 comprises a speed-reducing transmission and that the final speed of rotation of the members 3 in response to a substantially constant input speed of rotation applied to the shaft 41 can be increased, or decreased, by an appropriate adjustment of the change-speed gear 38. It has been found to be desirable that the member 3 should not rotate at a speed of less than substantially 40 revolutions per minute and it is preferred that said speed should be between substantially 43 and substantialle 60 revolutions per minute inclusive. With a speed of travel of the machine in the direction A of, for example, 2 kilometers per hour, a ratio between the circumferential speed of rotation of each member 3 and said speed of travel in the direction A of not less than $2\frac{1}{2}:1$ and not more than 5:1 can readily be attained, an advantageous value for this ratio of 2.8:1 being preferred.

As the soil working members 3 revolve with the cultivating tools 9A that comprise the portions 8 and 9 and the blades 10 penetrating deeply into the soil, the four members 3 will work corresponding strips of ground that marginally overlap each other to produce, in effect, a single broad strip of worked soil throughout substantially the total width of the machine between the outer limbs of its two forks 49. The tools 9A penetrate into, and work, the soil to an adjustable depth which will, however, be significatly greater than 25 centimeters and, since the strip-shaped portions 8 that support the blades 10 are disposed rearwardly of those blades with respect to the directions of operative rotation of the corresponding members 3 (and in substantially edgewise relationship with said directions of rotation), said portions 8 will not exert any significant smearing effect upon the worked soil. It will be remembered that the portions 8 extend downwardly and outwardly in divergent relationship from the corresponding supports 7 so that the lower tool portions 9 to which the blades 10 are actually fastened leave open spaces behind the respective blades 10 at locations radially inwardly of the strip-shaped portions 8 into which spaces the earth displaced by the blades 10 can escape rearwardly. Each cultivating tool 9A (comprising the parts 8, 9 and 10) preferably has an effective length of not less than substantially 50 centimeters to that the working depth of each soil working member 3 may be substantially 40 centimeters or more.

In the embodiment of FIGS. 1 to 9 of the drawings, each blade 10 is so disposed that a plane containing its curved center line is in substantially tangential relationship with an imaginary circle centered upon the corresponding axis of rotation a (FIG. 3). However, as previously mentioned, this is not essential and the blades 10 may be orientated obliquely inwardly or obliquely outwardly with respect to their forward directions of rotation in which case the modified construction that is shown in FIG. 10 of the drawings is appropriate. It has previously been mentioned that the pneumatic tire of each ground wheel 51 has an axial thickness, and therefore a tread width in contact with the ground surface, that is substantially the same as the regular spacing between the axes of rotation of the row of shafts 2 and 22. Said tread width thus advantageously has a magnitude of substantially 25 centimeters but may be as little as substantially 20 centimeters. This broad area of contact between the tyre of each wheel 51 and the ground surface provides an effective reaction to the forces which tend to increase the depth of penetration of the tools 9A into the soil as a result of the configuration of those tools and their rotation about the corresponding axes a during the operation of the machine. Quite heavy forces are also exerted upon the hollow frame portion 1 during operation of the machine and, if considered necessary, stiffening members (not shown) may be arranged inside the trough-shaped part 14 of the frame portion 1 between the successively meshing toothed pinions 28.

The machine that has been described with reference to FIGS. 1 to 10 of the drawings is suitable for the deep cultivation of soil without it being essential to employ a very heavy tractor of high power rating because the construction of the machine is such that a large proportion of the power generated by the tractor or other vehicle that is used can be transmitted to the working parts of the machine through the rear power take-off shaft of said tractor or other vehicle, only a quite small proportion of the generated power being required to be applied to the driven ground wheels of the tractor or other vehicle to move that tractor or other vehicle and the machine forwardly in the direction A. The machine can, for example, be employed very successfully in the cultivation of land for which conventional ploughs are not suitable and where spring tine cultivators have customarily been employed in the preparation of seed beds for cereal crops such as, for example, barley and wheat.

The soil cultivating machine or implement that is illustrated in FIGS. 11 to 19 of the drawings comprises a supporting frame 61 that extends substantially horizontally transverse, and usually substantially horizontally perpendicular, to the intended direction of operative travel of the machine that is again indicated in FIG. 11 by an arrow A. The supporting frame 61 comprises two parallel beams 62 and 63 that are at substantially the same horizontal level, each of them having a polygonal cross-section which it is preferred should be the square cross-section that is illustrated in the drawings (see particularly FIG. 12). The two beams 62 and 63 are spaced apart from one another in the direction A and both of them extend perpendicular or substantially perpendicular to that direction. When the beams 62 and 63 have the preferred square cross-section that is illustrated, it is also preferred that they should be disposed so that diagonals between the opposite corners of their cross-sections should extend substantially horizontally and substantially vertically, respectively. The two beams 62 and 63 are interconnected near their opposite ends, by supports 64 that are in substantially parallel relationship with the direction A. A hollow frame portion 66 is suspended from the front and rear beams 62 and 63 of the supporting frame 61 by four brackets 65 that are spaced apart from one another along the transverse length of the supporting frame 61 and frame portion 66, said brackets 65 being parallel to the direction A, at least as seen in the plan view of FIG. 11. The hollow frame portion 66, like the supporting frame 61, extends perpendicular or substantially perpendicular to the direction A and has its opposite ends spaced by substantially equal distances from the respective supports 64 that form parts of the supporting frame 61. Said hollow frame portion 66 is also located midway between the leading and rear frame beams 62 and 63 of the supporting frame 61 as seen in the plan view of FIG. 11. Two of the four brackets 65 connect the hollow frame portion 66 to the supporting frame 61 at the opposite ends of the frame portion 66 while the other two brackets 65 are located inwardly towards the center of the portion 66 by equal distances from the opposite ends of that portion.

Four vertical or substantially vertical shafts 67 are rotatably mounted in the hollow frame portion 66 at regular distances from one another along the transverse length of that frame portion. Each shaft 67 is provided at its lowermost end (that projects from beneath the bottom of the frame portion 66) with a corresponding soil working member that is generally indicated by the reference 68 and, in the embodiment that is being described, the longitudinal axes a (FIGS. 15 and 16) of the four shafts 67 are spaced apart from one another by regular distances of substantially 75 centimeters, said axes a also constituting the axes of rotation of the respective soil working members 68. The lowermost end of each shaft 67 that projects from beneath the bottom of a corresponding bearing housings 83 is provided with a flange 69 to which a carrier 71 is releasably secured by bolts 70. As seen in plan view (FIGS. 11 and 18), each carrier 71 is of substantially, although not exactly, equa lateral triangular configuration. The lower surface of each carrier 71 carries three strengthening ribs 72 that extend substantially radially outwards from the center of the carrier 71 concerned (and thus from the corresponding axis a) at angular intervals of substantially 120° around said center axis. The three deformed (from the point of view of a perfect equilateral triangle) corners of each carrier 71 are bent over upwardly (see FIGS. 12 and 15) and each upwardly bent-over portion has a corresponding flat support 73 welded or otherwise rigidly secured to it in perpendicular relationship therewith. Downwardly projecting stiffening rims 73A are welded or otherwise rigidly secured to the edges of the carriers 71 between the corner-mounted supports 73. The three flat supports 73 that correspond to each carrier 71 are of oblong configuration and thus their upper and lower edges are in parallel or substantially parallel relationship with the general plane of the major flat part of the carrier 71 concerned. Each flat support 73 has the upper end of a corresponding strip-shaped portion 74 firmly but releasably secured to it by an upper smaller diameter bolt 76 and a downwardly spaced lower larger diameter bolt 77, each upper smaller diameter bolt 76 being a shear bolt. The strip-shaped portions 74 are in abutting parallel relationship with the corresponding support 73 and form parts of three cultivating tools 75 of each soil working member 68. The three strip-shaped portions 74 that correspond to each soil working member 68 diverge downwardly from the corresponding three flat supports 73 relative to the respective axis a and each of them merges, at its lower end, into a corresponding portion 78 that is directed forwardly, and downwardly to some extend, with respect to the intended direction of operative rotation of the member 68 concerned (see the arrows in FIGS. 11 and 18 of the drawings). The arrangement is such that the lower leading extremity of each portion 78 with respect to the direction of rotation that has just been mentioned is in tangential, or substantially tangential, relationship with an imaginary circle centred upon the corresponding axis a. In fact, the longitudinal axis b (FIG. 15) of the lower leading extremity of each portion 78 is inclined at an angle of between substan-tially 50° and substantially 70° to a plane that contains one side edge of the corresponding strip-shaped portion 74. This relationship can probably best be seen in FIG. 18 of the drawings. Each lower portion 78 has a corresponding replaceable blade 79 of pointed configuration firmly secured to it by a bolt (FIG. 15). The longitudinal axis or centre line of each pointed blade 79 is coincident, or at least coplanar, with the longitudinal axis b of the lower leading extremity of the respective lower tool portion 78 and said blade 79 has a length which subtends an angle of substantially 25° at the corresponding axis of rotation a. In the embodiment that is being described, the effective radius of each soil working member 68 is substantially 37.5 centimeters and it will be noted from FIG. 18 of the drawings that the points of the three blades 79 of the three tools 75 of each member 68 are directed forwardly and outwardly to some extent with respect to the intended direction of operative rotation of the member 68 concerned so that said blades 79 occupy a "biting" position relative to the soil with which they will co-operate when the machine is in use. The lower portion 78 of each tool 75 merges immediately behind the lower leading extremity thereof that carries the corresponding blade 79, into the lower end of the integral strip-shaped portion 74 by way of a bend. It is preferred that the angle by which each strip-shaped portion 74 diverges outwardly and downwardly with respect to the corresponding axis of rotation a should have a magnitude of between substantially 10° and substantially 16°.

The hollow frame portion 66 of the machine comprises a lower trough shaped part 80 whose upwardly directed limbs have horizontally bent-over coplanar rims to which a substantially horizontal cover plate 81 is secured by a plurality of small bolts with the intervention of a sealing gasket (see FIG. 17). The four shafts 67 that correspond to the four soil working members 68 are rotatably supported substantially midway along their upright lengths and near to their lowermost ends by pairs of opposed tapered roller bearings 82 which bearings have their outer races arranged internally of the aforementioned bearing housings 83 that project downwardly from the bottom of the hollow farme portion 66. Each bearing housing 83 has a flange 84 at its upper end and that flange is located internally of the rough-shaped part 80 of said hollow frame portion 66. The bearing housings 83 are rigidly but releasably secured in their appointed positions in the hollow frame portion 66 by their flanges 84, supporting members 85 which are located inside the trough-shaped part 80, supporting rings 85A that surround said housings 83 immediately beneath the bottom of the part 80 and by bolts 86 which draw the parts that have just been discussed into tight sandwiching relationship with the margins of holes in the bottom of the trough shaped part 80 with the provision of oil-sealing gaskets. Each supporting member 85 is fastened to the upright walls of the trough-shaped part 80 by strips 87A having bent-over ends and by co-operating bolts 87, recessed strengthening portions of said members 85 being disposed substantially parallel to the direction A between the front and rear walls of said part 80 (see particularly FIGS. 15 to 17 of the drawings). The lower end of each cylindrical bearing housing 83 is disposed immediately above the upper surface of the corresponding shaft flange 69 with only a minimum of clearance therebetween. Five intermediate shafts 88 and one intermediate shaft 98 (FIG. 13) are arranged in three pairs between the four rotary shafts 67 with their respective longitudinal axes in parallel and coplanar relationship with the four axes a. The axes of rotation of the ten shafts 67, 88 and 98 are spaced apart from one another, in this embodiment, at regular intervals which have magnitudes of substantially 25 centimeters. Each of the intermediate shafts 88 (FIGS. 15 and 16) has a ring 90 fastened to it very close to its lowermost end which ring 90 fits in an appropriately positioned circular hole in the bottom of the trough-shaped part 80. A square plate 89 surrounds the shaft 88 immediately above the ring 90 at a location inside the hollow frame portion 66 and bolts 91 are entered upwardly through small holes in the bottom of the part 80 to co-operate in a releasably fastening manner with screwthreaded holes in the four corner regions of the square plate 89. The upper ends of the intermediate shafts 88 are stub-shaped and are received in matchingly shaped blind bores formed in stepped supports 92 that are secured to the cover plate 81 of the hollow frame portion 66 by bolts 93. As can be seen in FIG. 15 of the drawings, intermediate steps of the supports 92 are lodged in matchingly dimensioned holes formed in the cover plate 81.

Each of the four shafts 67 is provided, inside the hollow frame portion 66, with a straight toothed or spur-toothed pinion 94 whose hub has internal splines that co-operate drivingly with external splines on the shaft 67 concerned. The shafts 67 have short screwthreaded upper end portions of reduced diameter and these upper end portions receive nuts 95 which co-operate with the hubs of the pinions 94 by way of interposed cup washers in preventing said pinions 94 from becoming axially disengaged from the shafts 67 under circumstances of normal use. Each of the five intermediate shafts 88 is rotatably surrounded by a corresponding streight-toothed or spur-toothed pinion 96 that is of the same effective diameter as each of the pinions 94. However, since the shafts 88 are fixed shafts the hubs of the pinions 96 co-operate rotatably therewith by way of upper and lower pairs of opposed tapered roller bearings 97. Portions of the non-rotary shafts 88 are screwthreaded and carry nuts 96A and co-operating cup washers to maintain the bearings 97, and thus the pinions 96, in their appointed positions axially along the shafts 88. The pinions 96 that correspond to the intermediate shafts 88 transmit rotation between the pinions 94 during the use of the machine and it will be noted that, after removing the cover plate 81 and the bolts 70, each shaft 67 can be removed from the machine, together with the corresponding pinion 94, bearing housing 83 and associated parts, merely by releasing the bolts 86 and 87.

The intermediate shaft 98 (FIG. 13) is one of the center pair of the total of ten shafts 67, 88 and 98 and differs from the other intermediate shafts 88 in several respects. Firstly, it is surrounded by a straight-toothed or spur-toothed pinion 95A that is of the same diameter as, and in meshing relationship with, the flanking pinions 94 and 96 but said pinion 95A is driven from the shaft 98 in an indirect manner. A disc 100 is fastened to the upper surface of the pinion 95A, inside its toothed periphery, by longer and shorter bolts 99 and 99A. The longer bolts 99 also secure a housing 101 to the upper surface of the disc 100, the shape of said housing 101 being visible in FIGS. 13 and 14 of the drawings from which latter, in particular, it will be apparent that the housing defines three chambers which are spaced apart from one another at 120° intervals around its own upright longitudinal axis, said chambers centrally accommodating three corresponding upright stub shafts 102 which are in parallel relationship with one another. Each stub shaft 102 has a corresponding toothed pinion 103 freely rotatably mounted therearound, in the corresponding chamber of the housing 101, by way of roller bearings that are shown only diagrammatically in the drawings. The teeth of the three pinions 103 all mesh with those of a surrounding internally toothed ring 105 that is secured by bolts 104 to an internal flange of an embracing gear box 106 having a rim at its bottom that is fastened to the rims of the part 80 and to the cover plate 81 by somewhat longer, but otherwise equivalent, bolts to the previously mentioned bolts that can be seen in FIG. 17 of the drawings. The lowermost end of the intermediate shaft 98 is rotatably supported by a ball bearing 107 mounted in a housing 108 that is fastened in position in a hole in the bottom of the part 80 by bolts 109 and a co-operating internal fastening ring, and oil sealing gasket being provided.

In addition to being in mesh with the surrounding internally toothed ring 105, the teeth of the three pinions 103 also mesh with the teeth of a central pinion 110 that is integral with, or rigidly secured to, an upright shaft 111 that is disposed partly inside the gear box 106 in axial register with the underlying intermediate shaft 98. The shaft 111 projects, however, upwardly from the gear box 106 into the interior of a further gear box 112 that is fastened to the top of the gear box 106 by bolts. Transmission parts that will hereinafter be described enable the shaft 111 to be placed in driven connection, from the further gear box 112, with the power take-off shaft of an agricultural tractor or other vehicle that is used to move and operate the machine when the latter is in use. A central region of the upright shaft 111 is rotatably supported from a top wall of the gear box 106 by opposed upper and lower tapered roller bearings 114A. It will be apparent from FIGS. 13 and 14 of the drawings that the central pinion 110 and the surrounding freely rotatable pinions 103 form a sun and planet gear system which is part of a speed-reducing transmission between elements contained within the further gear box 112 and the pinions 95, 95A and 96 that transmit drive to the shafts 67. A splined upper end of the upright shaft 111 is indirectly connected, inside the further gear box 112, to a crown wheel or pinion 113 by a number of bolts. The crown wheel or pinion 113 has its teeth in driven mesh with those of a smaller bevel pinion 114 that is fast in rotation with a substantially horizontal shaft 115 of the further gear box 112 that is parallel or substantially parallel with the direction A. The rear end of the shaft 115, with respect to the direction A, is connected by pinions of a change speed gear 116 to an overlying and parallel shaft 117. The change speed gear 116 is very similar in construction and function to the previously described change-speed gear 38 of the first embodiment and differs significantly therefrom only in that the shaft 117 projects also from the back of the change-speed gear 116, with respect to the direction A as well as from the front of the further gear box 112 to which said change-speed gear 116 is connected, The leading forwardly projecting splined or otherwise keyed end of the shaft 117 is intended to be placed in driven connection with the power take-off shaft of the agricultural tractor or other vehicle which moves and operates the machine by way of an intermediate telescopic transmission shaft 142 (FIG. 11), that is of a construction which is known per se, having universal joints at its opposite ends. The splined or otherwise keyed end of the shaft 117 that projects rearwardly from the back of the change-speed gear 116 can be used as a source of rotary drive for the moving parts of some other machine or implement that may be arranged behind the soil working machine for use in combination therewith.

Each of the supports 64 that interconnects the leading and rear beams 62 and 63 of the supporting frame 61 is provided, near to its rearmost end and thus close to the rear frame beam 63, with two donwardly projecting lugs 118 (FIGS. 11, 12 and 19) and each such pair of lugs 118 carries, at the lower end thereof, a horizontal pivot 119 about which a corresponding downwardly and forwardly directed arm 120 is freely turnable both upwardly and downwardly. Each arm 120 initially extends rectilinearly from the corresponding pivot 119 but, towards its leading end, it is offset laterally outwards towards the neighbouring end of the supporting frame 61 to terminate in a final leading portion which is substantially parallel to the rear portion thereof, said finalleading portion fixedly supporting an axle shaft. Each of the two axle shafts has a corresponding pneumatically tired ground wheel 121 rotatably mounted thereon at the inner side, with respect to the centre of themachine, of the immediately neighbouring final leading portion of the respective arm 120. Each ground wheel 121 is provided with a mud/earth scraper 121A (FIG. 19), said scraper 121A being secured to the arms 120. The pneumatich tyres of the two ground wheels 121 each have a tread width in an axial direction which is substantially equal to the distance between the axes of rotation of any two neighbouring shafts of the row of ten shafts 67, 88 and 98. The front of the leading frame beam 62 of the supporting frame 61 is provided, at two locations which are in register with the foremost ends of the two supports 64, with upwardly and forwardly inclined supports 122 whose upper ends each carry a corresponding pair of spaced lugs 123. Horizontally aligned trunnion pins turnably carry a block of a corresponding height adjustment mechanism 124 between the two lugs 123 of each pair. The infinitely variable height adjustment mechanisms 124 are known per se and it in only necessary to point out hat each of them has a crank handle at ist upper end, said crank handles being manually rotatable to increase, or decrease, the effective length of each mechanism 124, as may be required. The lower ends of the mechanisms 124 are connected by horizontal pivots to pairs of lugs 125, said pairs of lugs 125 being carried by the respective arms 120. Each final leading portion of each arm 120 is provided, close to the bend which interconnects that portion and the front of the respective laterally offset arm portion, with an upwardly directed guide rod 126 which guide rod is entered through a sleeve 127 (FIG. 19) that is fastened to the front of the leading beam 62 very close to the neighbouring end of that beam. Moreover, brackets 128 of L-shaped cross section are fastened to the opposite ends of both the leading and rear beams 62 and 63 of the supporting frame 61 in upwardly and forwardly inclined oblique positions so that rear limbs thereof define similarly disposed supporting surfaces for the upper and thus leading ends of straight arms 129. The lower and therefore rearmost ends of each pair of arms 129 are secured to the top of a corresponding holder 130 which extends parallel or substantially parallel to the direction A.

Each holder 130 carries a corresponding plate 131 that also extends parallel or substantially parallel to the direction A, the holders 130 being secured to the respective plates 131 at levels just above the centers thereof considered in relation to their vertical heights. FIG. 12 of the drawings shows that the leading end of each holder 130 is spaced rearwardly by some distance from the leading end of the corresponding plate 131, with respect to the direction A, but that the rear ends of the holders 130 coincide with the rear edges of the plates 131. In fact, the plates 131 are bent over sharply outwards (see FIG. 19) at the level of the corresponding holders 130 to form downwardly and outwardly inclined oblique portions 132 that are both of flat configuration. Both the front and rear ends, with respect to the direction A, of the lower edge of each portion 132 are bevelled upwardly and each portion 132 has a top to bottom width which is not less than half the total top to bottom with of the corresponding plate 131. The upper portion of each plate 131 that is located above the corresponding oblique portion 132 is provided at both its leading and rear ends, with respect to the direction A, with bevelled edges that are substantially symmetrically similar to the bevelled edges of the lower oblique portions 132. Upper pivot bolts 133 are employed to connect the arms 129 to the oblique supporting surfaces of the brackets 128 but said connections are also established, at locations beneath the pivot bolts 133, by smaller shear bolts 134. Thus, in the event of an abnormal displacing force being exerted upon one of the plates 131, said plate 131 can deflect laterally about the axes defined by the forwardly and downwardly inclined pivot bolts 133 after breakage of the shear bolts 134 concerned.

The rear beam 63 of the supporting frame 61 is provided at a distance towards one end thereof from its midpoint with a holder 135 in which a carrier 136 is upwardly and downwardly slidable. FIG. 12 of the drawings shows that the carrier 136 is in parallel or substantially parallel relationship with the four arms 129 to which the two plates 131 are indirectly secured. The carrier 136 is formed with three transverse holes 139 and any chosen one of those three holes can be used to maintain said carrier 136 in a corresponding position of downward projection from the supporting frame 61 by co-operation with a horizontal locking pin 138 is entered through holes in limbs of the holder 135. The lowermost end of the carrier 136 is provided with a supporting foot 137 and the three possible positions of the carrier 136 and its foot 137 that can be attained relative to the supporting frame 61 by causing the locking pin 138 to co-operate with chosen ones of the three holes 139 will be discussed below in relation to a description of the operation of the machine.

The leading beam 62 of the supporting frame 61 is provided with a coupling member or trestle 140 having lower coupling points for pivotally connected the supporting frame 61 to the three-point lifting device or hitch of an agricultural tractor or other vehicle which moves and operates the machine during its use and an upper coupling point for connection to the free end of the upper adjustable length lifting link of said three-point lifting device or hitch. It will be noted from FIG. 11 of the drawings that the two lower coupling points of the member or trestle 140 are in register, in the direction A, with the leading ends of the two inner brackets 65 of the four brackets 65 by which the hollow frame portion 66 is supportingly suspended from the beams 62 and 63. Downwardly and rearwardly, with respect to the direction A, divergent tie beams 141 rigidly secure substantially the apex of the generally triangular coupling member or trestle 140 to lugs that are carried by the two inner brackets 65 close to the rearmost ends of those brackets.

The soil cultivating machine that has been described with reference to FIGS. 11 to 19 of the drawings operates in a basically similar manner to the machine of FIGS. 1 to 10 of the drawings. The coupling member or trestle 140 of the machine is connected to the three-point lifting device at the rear of an agricultural tractor or other operating vehicle and the splined or otherwise keyed leading end of the input or driving shaft 117 of the further gear box 112 is placed in driven connection with the power take-off shaft of the same tractor or other vehicle by way of the known intermediate telescopic transmission shaft 142 that has universal joints at its opposite ends. Adjustments that may be made before work commences include establishing the maximum depth to which the tools 75 of the soil working members 68 can penetrate into the soil by bodily raising or lowering the two ground wheels 121 relative to the supporting frame 61. Such displacement of the wheels 121 is, of course achieved by rotating the crank handles at the upper ends of the height adjusting mechanisms 124 in appropriate directions and turns the arms 120 and the wheels 121 which they carry either upwardly or downwardly about the pivots 119. A working depth of more than 25 centimeters can readily be attained and it is, in fact, preferred that said working depth should no be less than substantially 40 centimeters. The speed at which the soil working members 68 will revolve around the axes a in response to a substantially constant input speed or rotation applied to the shaft 117 can be increased or decrased by an appropriate selection of pinions for use within the change-speed gear 116. These adjustments will normally be made having regard to the nature and condition of the soil that is to be worked and to the purpose for which that soil is intended after cultivation. As indicated by four arrows in FIG. 11 of the drawings, each soil working member 68 will revolve, during operation, in a direction which is opposite to the direction of rotation of its immediate neighbour or both of its immediate neighbours in the single row thereof. Broken circular lines in FIG. 11 of the drawings indicate the working widths of the individual members 68 and it will be seen from FIG. 11 that said working widths overlap one another to a samll extent to produce, in effect, a single broad strip of worked soil. The tools 75 of the four soil working members 68 break up the soil down to the pre-set maximum working depth which, it will be remembered, is preferably greater than 40 centimeters but this deep and thorough cultivation of the soil takes place without any significant mixing of the top soil with the underlying subsoil. A most effective aeration of the soil is produced down to a relative great depth, as compared with cultivational machines, and this is, of course, equally true of the machine of FIGS. 1 to 10 of the drawings. The machine of FIGS. 11 to 19 of the drawings is particularly, but not exclusively, suitable for cultivating the soil immediately prior to wintering thereof. The deep cultivation that is produced by the machine leaves the soil in a roughly broken condition that is ideal for benefiting from the subsequent action of frost and winter conditions generally with a view to the quick and easy preparation of a good seed bed next spring. The positions of the blades 79 are such as to ensure a high resistance to damage or breakage during operation but any blade 79 that becomes seriously damaged or broken, or worn to an unacceptable extent by prolonged usage, can readily be replaced merely by temporarily removing a single bolt.

The movement of the soil working members 68 through the ground down to the depth that is necessary to produce a deep and thorough cultivation consumes a lot of power. The transmission of rotary power at the required rating from the shaft 117 to the soil working members 68 can readily be attained through the sun and planet gear system that has been described above with particular reference to FIGS. 13 and 14 of the drawings. The planet wheels (pinions 103) enable a compact speed-reducing transmission to be constructed and the use thereof in combination with the change-speed gear 116, appropriately adjested, can reduce an input speed of rotation of substantially one thousand revolutions per minute to a speed of rotation of the soil working members 68 of between substantially 30 and substantially 190 revolutions per minute. The rotary mountings (roller bearings 82 and bearings housings 83) of the shafts 67 enable said shafts 67 to be removed from, and installed in, the hollow frame portion 66 both quickly and easily, This is, of course, a considerable practical advantage in the event of damage or breakage occurring during use of the machine. The upper and lower bearings 82 and their housings 83 are capable of resisting the heavy potentially deforming forces that are exerted thereupon during operation of the machine and this is also a reason for employing the roller bearings 97 for rotatably supporting the "idle" transmission pinions 96. The supporting members 85 that are arranged inside the hollow frame portion 66 effectively transfer to that frame portion the forces that are exerted upon the corresponding soil working members 68. The plates 131 co-operate with the tools 75 of the end soil working member 68 of the row in cultivating the soil and serve to some extent as shield plates in preventing stones and the like from being flung laterally of the machine. If a large stone, root or the like should become jammed between one of the tools 75 and one of the plates 131, the corresponding pair of shear bolts 134 will break and said plate will be able to yield outwardly and upwardly about the pivot bolts 133 to allow the obstacle to be released. The broken shear bolts 134 can quickly, easily and inexpensively be replaced.

The supporting foot 137 at the rear of the machine with respect to the direction A is principally employed in ensuring that the tools 75 of the soil working member 68 will not contact the ground when the machine is disconnected from its operating agricultural tractor or other vehicle. The lowermost hole 139 in the carrier 136 co-operate with the locking pin 138 in the working position of the machine that is illustrated in FIG. 12 of the drawings so that said foot 137 is maintained will clear of contact with the ground. When the machine is merely to be "parked" after use, the center one of the three holes 139 is employed and the foot 137 occupies the upper one of the two broken line positions that are illustrated in FIG. 12, the mechanisms 124 also having been operated to move the ground wheels 121 downwardly substantially as far as is possible relative to the supporting frame 61. The change speed gear 116 comprises a readily releasable cover that is held in position by, for example, at least one wing nut as can be seen in FIG. 13 of the drawings. It is, of course, necessary for the change speed gear 116 to contain oil or other lubricant and loss of that oil or other lubricant can be substantially prevented, when an exchange or interchange of the pinions beneath the cover is to be effected, by first moving the carrier 136 into the position in which the uppermost hole 139 co-operates with the locking pin 138. The foot 137 will then be in the lowermost most broken line position that is shown in FIG. 12 of the drawings and the machine will be tilted forwardly to a considerable extend. Appropriate adjustments of the mechanisms 124 can increase and decrease the extend of this tilt.

Although certain features of the soil cultivating machines or implements that have been described and/or that are illustrated in the accompanying drawings will be set forth in the following claims as inventive features, it is emphasised that the invention is not necessarily limited to those features and that it includes within its scope each of the parts of each soil cultivating machine embodiment that has been described, and/or that is illustrated in the accompanying drawings, both individually and in various combinations.

What we claim is:

1. A soil cultivating machine comprising a frame and a plurality of soil working members positioned in a row that extends transverse to the direction of travel, said soil working members being rotatable in relative opposite directions about corresponding substantially vertical axes and each member comprising carrier means and at least one downwardly extending tool supported on said carrier means, driving means engaging said members to rotate same, said tool comprising a substantially straight, strip-like supporting portion that extends downwardly and outwardly from the carrier, the maximum width of the supporting portion being tangential to an imaginary circle centered on the axis of rotation of the corresponding soil working member, the upper end of the supporting portion being detachably fastened to said carrier means with two fastening members positioned one above the other, one of said fastening members being a shear bolt, the lower end of said supporting portion being directed forwardly with respect to the normal direction of rotation of said soil working member and a leading side of said forwardly directed lower end mounting a longitudinal blade that extends below the lower end, said blade being fastened to said end by pivot means, the longitudinal center line of said blade being substantially tangential to an imaginary circle centered on the axis of rotation of said soil working member and being pivotable about an axis that extends transverse to its longitudinal center line, whereby said blade can be orientated inwardly or outwardly with respect to the forward direction of rotation thereof.

2. A machine as claimed in claim 1, wherein each blade is pointed and the side of greatest length thereof extends generally in said direction of rotation.

3. A machine as claimed in claim 1, wherein said lower end of the tool is bent over inwardly with respect to said axis of rotation and located radially inwards of an imaginary circle that contains the path of operative rotation of the radially outermost point of said member.

4. A machine is claimed in claim 1, wherein the longitudinal axis of said end is substantially contained in a plane that also contains said axis of rotation, the longitudinal axis of said portion intersecting said axis of rotation at an angle of between 10° and 17° inclusive.

5. A machine as claimed in claim 1, wherein said soil working members are mounted on corresponding upwardly extending shafts with pinions in mesh with further pinions on intermediate shafts located between said first-mentioned shafts, said intermediate shafts being fastened to the bottom of an elongated frame portion and releaseably connected in upper housings secured to the top thereof.

6. A machine as claimed in claim 5, wherein said frame portion is hollow and supporting members are located within that portion securing bearing housings of said members in position, said supporting members being fastened to upright walls of said frame portion.

7. A machine as claimed in claim 6, wherein each support member comprises upwardly extending wall portions which extend between said upright walls.

8. A machine as claimed in claim 5, wherein a drive transmission to said soil working members comprises a speed-reducing transmission positioned between an imput shaft that is in driven connection with a power take-off shaft of a tractor and parts which drivenly interconnect upwardly extending shafts that define the axes of rotation of the soil working members.

9. A machine as claimed in claim 8, wherein said transmission comprises a toothed pinion with teeth in driving mesh with the teeth of a larger toothed pinion mounted on one of said upwardly extending shafts of a respective soil working member, said larger pinion being arranged above a further toothed pinion and the latter being one of said parts rotatably interconnecting said shafts.

* * * * *